(12) United States Patent
Peyman et al.

(10) Patent No.: US 9,725,192 B2
(45) Date of Patent: Aug. 8, 2017

(54) AIRSHIP POWERED AEROSPACE VEHICLE

(71) Applicants: Kevin Arash Peyman, Richmond, VA (US); Nazmi Peyman, Richmond, VA (US)

(72) Inventors: Kevin Arash Peyman, Richmond, VA (US); Nazmi Peyman, Richmond, VA (US)

(*) Notice: Subject to any disclaimer, the term of this patent is extended or adjusted under 35 U.S.C. 154(b) by 0 days.

(21) Appl. No.: 14/667,068

(22) Filed: Mar. 24, 2015

(65) Prior Publication Data

US 2015/0217848 A1    Aug. 6, 2015

(51) Int. Cl.
| | | |
|---|---|---|
| *B64G 1/00* | (2006.01) | |
| *B64B 1/40* | (2006.01) | |
| *B64B 1/62* | (2006.01) | |
| *B64C 37/02* | (2006.01) | |
| *B64G 1/40* | (2006.01) | |

(52) U.S. Cl.
CPC .............. *B64G 1/002* (2013.01); *B64B 1/40* (2013.01); *B64B 1/62* (2013.01); *B64C 37/02* (2013.01); *B64G 1/005* (2013.01); *B64G 1/401* (2013.01)

(58) Field of Classification Search
CPC ........ B64G 1/002; B64G 1/005; B64G 1/409; B64G 2001/1092; B64B 1/24; B64B 1/40; B64B 1/58; B64B 1/62
USPC .......................................... 244/61
See application file for complete search history.

(56) References Cited

U.S. PATENT DOCUMENTS

| | | | | |
|---|---|---|---|---|
| 3,614,031 | A | * | 10/1971 | Demboski .................. 244/32 |
| 2005/0116091 | A1 | * | 6/2005 | Kelly ............................ 244/24 |
| 2008/0035787 | A1 | * | 2/2008 | Thompson ............... B64B 1/24 244/97 |
| 2012/0119035 | A1 | * | 5/2012 | Sharif ........................ B64B 1/06 244/158.9 |

* cited by examiner

*Primary Examiner* — Nicholas McFall
(74) *Attorney, Agent, or Firm* — Barry Choobin; Patent 360

(57) ABSTRACT

An aerospace vehicle comprising an airplane or spacecraft, operatively coupled to an airship balloon containing lighter than air gas adapted to elevate the vehicle. A control system adapted to deflate the balloon upon reaching a specific altitude by directing the gas to a propulsion system and high pressure gas chambers for powering the vehicle at a greater speed or to a greater altitude. The balloon can be retracted into the vehicle to achieve a better aerodynamic shape and further re-inflated for decreasing the speed of the vehicle upon reaching a destination.

2 Claims, 5 Drawing Sheets

AIRSHIP POWERED AEROSPACE VEHICLE

FIELD OF THE INVENTION

The present invention generally relates to airships powered by gas or gases lighter than air and more specifically relates to the use of airships for flying manned or unmanned aircraft and space crafts.

BACKGROUND OF THE INVENTION

Airships are commonly used for carrying bulky loads across different regions through varying flight conditions. Existing airships used for shipping high loads have envelope structures capable of withstanding overpressures and environmental conditions. There also exists steerable space balloons to carry a payload for the exploration of the atmospheric layers, these structures comprise a carrier balloon inflated with a lighter-than-air gas such as hydrogen or helium, coupled with a stabilizer balloon inflated with air.

Generally, airships are elongated structures broadly classified into dirigibles and blimps. The major difference between the two classes is that the blimp lacks a rigid support framework present in the dirigible. The elongated shape provides a greater aerodynamic efficiency including greater attitude, speed, and endurance for a given propulsion system. Airships use a lifting gas, which is lighter than air, such as hydrogen or helium for ascending and/or floating. Upon take off, the airships are able to fly at a certain altitude at a relatively low speed due to their large size, aerodynamics, and shape.

Aircrafts such as airplanes are able to travel at higher speeds, but generally require a runway for takeoff and landing purposes. The process of takeoff and landing is usually noisy and uses a high amount of energy, which results in dumping of a large number of toxins in residential areas surrounding airstrips. In addition, the airplane fuels contain significant amount of lead and other pollutants, which on combustion results in contamination of atmospheric air.

Airships have the potential to carry large quantities of goods and passengers. This potential can be leveraged along with the lighter than air gas or gases powered ascent and flight of airships, for flying manned or unmanned aircrafts and spaceships.

SUMMARY OF THE INVENTION

The present invention generally relates to use of airship for flying manned or unmanned aerospace vehicle such as an aircrafts or space crafts. The airship comprises a balloon structure containing lighter than air gas, adapted to provide initial lift or elevation up to a specific altitude to the vehicle. A control system adapted to deflate the balloon upon reaching a certain altitude and transfer the gas to a propulsion system and/or or to store in high pressure gas chambers for future use. The gas stored in high pressure gas chambers can be used as a fuel for powering the vehicle further or to re-inflate the balloon to reduce the speed of the vehicle upon reaching a destination.

In one embodiment, the aerospace vehicle comprises an airplane operatively coupled to a balloon containing lighter than air gas adapted to elevate the airplane. The vehicle further comprises a control system adapted to: deflate the balloon upon reaching a predetermined altitude and direct the gas for powering the airplane and/or to store the gas in high pressure gas chambers. The gas stored in high pressure chambers can be used in the future as a fuel to power the airplane or to re-expand the balloon in order to decrease the speed of the airplane upon reaching a destination or during floatation. The control system is further adapted to deflate the balloon in a controlled manner for landing the airplane.

In another embodiment, the aerospace vehicle comprises: a spacecraft comprising a propulsion system coupled to a balloon containing lighter than air gas, adapted to elevate the spacecraft; and a control system adapted to deflate the balloon upon reaching a predetermined altitude, by directing the gas into the propulsion system for further ascending the spacecraft and/or to store the gas in high pressure chambers for future use. The stored gas is used as a fuel for further ascent of the spacecraft. The control system is further adapted to disengage the balloon upon complete deflation.

DETAILED DESCRIPTION OF THE INVENTION

The following detailed description of the preferred embodiments presents a description of certain specific embodiments to assist in understanding the claims. However, the present invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details.

The present invention generally relates to an aerospace vehicle comprising an aircraft or a spacecraft powered by an airship. In one embodiment, an airplane is operatively coupled to a balloon structure containing lighter than air gas, which elevates or provides lift to the airplane from ground surface. Upon reaching a predetermined altitude, a control system within the airplane deflates the balloon and directs the gas to a propulsion system for powering the airplane or to high pressure gas chambers for future use of the gas as a fuel for further powering the airplane or to use the gas for re-expanding the balloon. Further, the control system retracts the balloon structure into the airplane, thereby achieving a better aerodynamic shape that facilitates high speed flying. The speed of the airplane begins to increase as the balloon begins to deflate and the airplane gradually attains a better aerodynamic shape upon complete deflation of the balloon. Upon reaching a destination point, the balloon is re-expanded for reducing the speed of the airplane and further deflated in a controlled manner for landing.

Figure 1A:
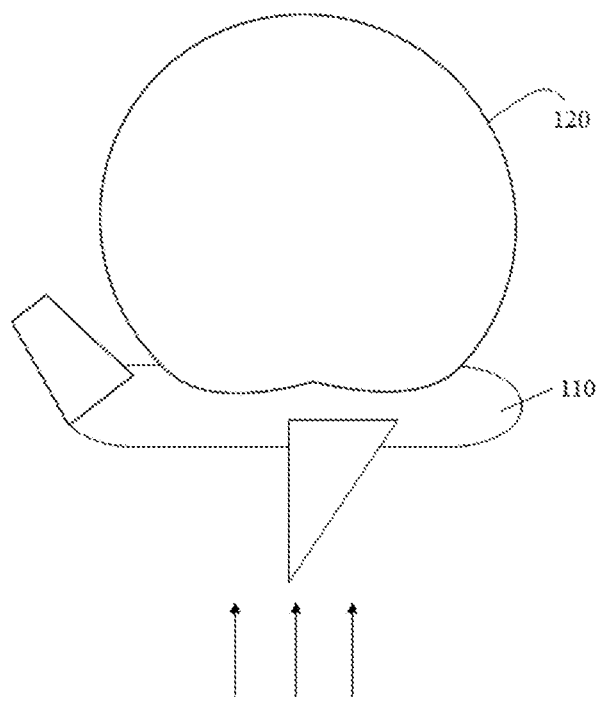
FIG. 1A is a side view of an airplane with balloon inflated during takeoff, according to an embodiment of the invention.
Figure 1B:
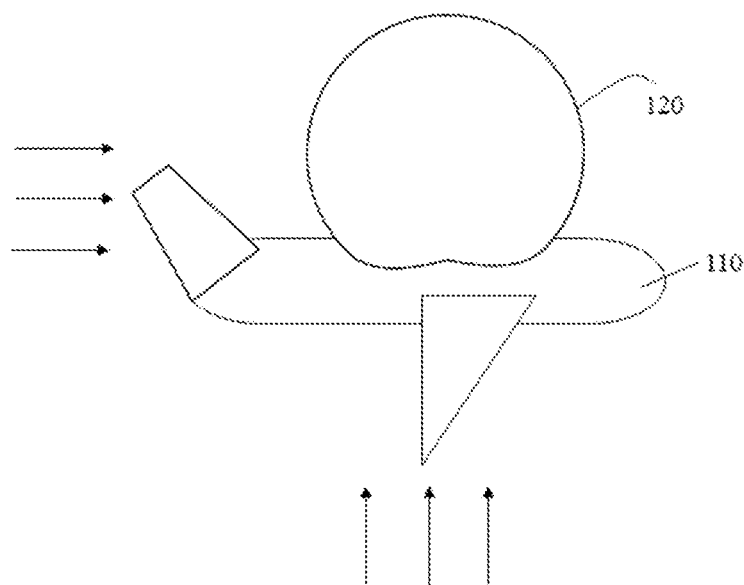
FIG. 1B is a side view of the airplane with balloon beginning to deflate upon reaching a predetermined altitude.

Referring to FIG. 1A-1E, which shows side view of an airplane coupled with a balloon, during different stages of flight. FIG. 1A shows the airplane 110 with the balloon 120 completely inflated with lighter than air gas during takeoff. The aerospace vehicle of the present invention acquires initial lift or elevation up to a certain altitude provided by lighter than air gas or gases such as hydrogen or helium and doesn't require a runway or airstrip for takeoff or landing purposes or conventional airplane fuel that may contain harmful pollutants. FIG. 1B shows the balloon 120 coupled to the airplane 110, beginning to deflate upon reaching a predetermined altitude. The speed of the airplane 110 increases as the balloon 120 deflates and achieves a greater cruising speed as the balloon deflates completely.

Figure 1C:
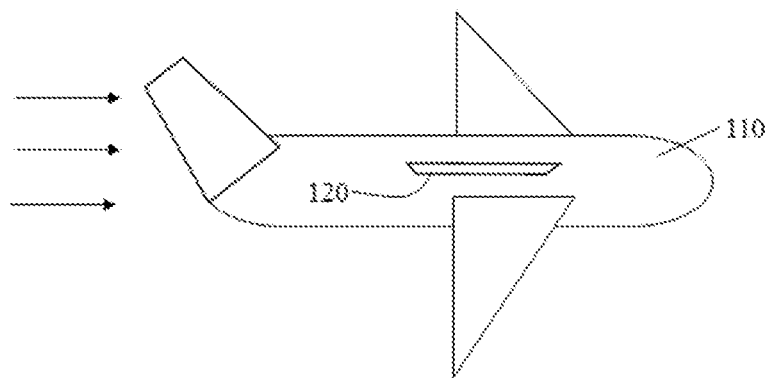
FIG. 1C is a side view of the airplane with balloon completely deflated and refracted to achieve an aerodynamic shape.

In an embodiment, a control system directs the gas from the balloon to a propulsion system of the airplane for increasing the speed of flight and the balloon structure is collapsed upon complete deflation and retracted into the airplane for achieving a better aerodynamic shape. FIG. 1C shows the airplane 110 with the balloon 120 completely deflated and retracted into the airplane for achieving a better aerodynamic shape. The shape of the airplane along with the propulsion system powered by lighter than air gas from deflated balloon enables high speed flight. In another embodiment, gas from the balloon is directed to high pressure chambers or gas tanks for storage and future use of the stored gas as a fuel or to re-expand the balloon. The propulsion system may comprise an engine, adapted to power the airplane.

Figure 1D:
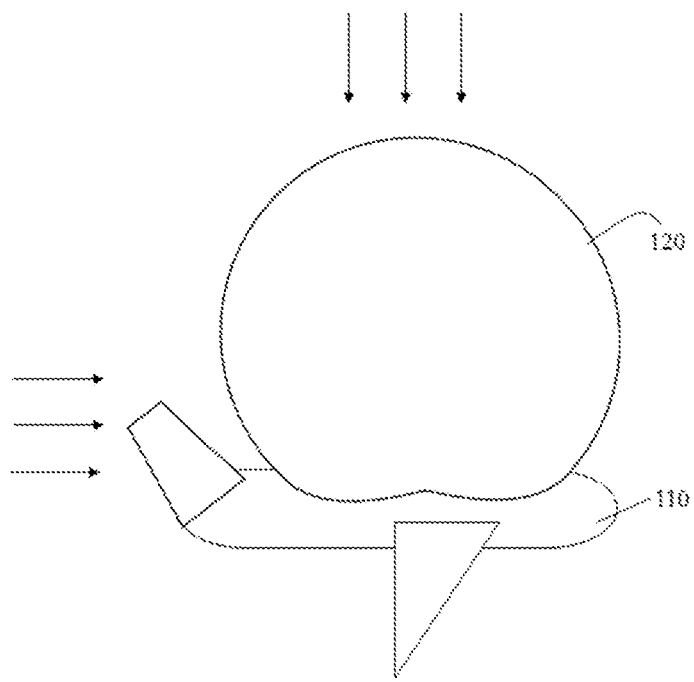
FIG. 1D is a side view of the airplane with balloon re-expanded upon reaching a destination.
Figure 1E:
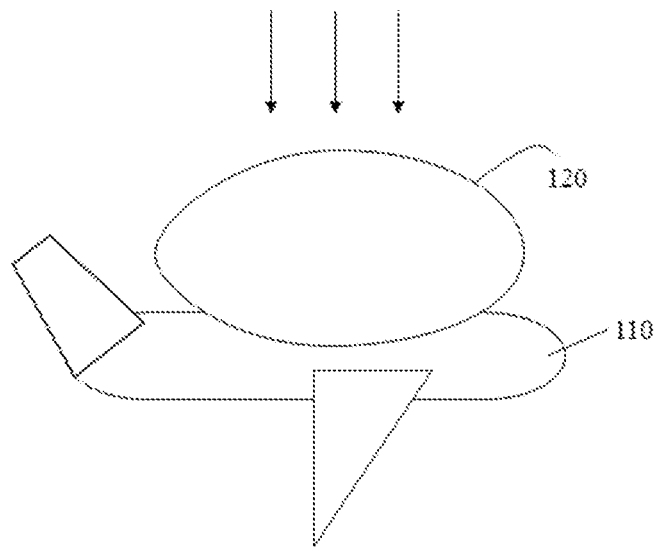
FIG. 1E is a side view of the airplane showing controlled deflation of the balloon during landing.

FIG. 1D shows the airplane 110 with the balloon 120 re-expanding upon reaching a destination point. In an embodiment, the control system re-inflates the balloon 120 using the gas stored in high pressure chambers or gas tanks, in order to reduce the speed of the airplane 110. The speed of the airplane 110 is gradually reduced and airplane 110 becomes less aerodynamic during re-inflation of the balloon 120. FIG. 1E shows controlled deflation of the balloon 120 that is coupled to the airplane 110, during landing. Controlled deflation allows floating or descending of the airplane towards a landing area, which can be relatively small and eliminates the need for vast and expensive runways for landing purposes. The control system is also adapted to re-inflate the balloon using the stored gas from high pressure chamber during emergency landing on a water body such as a sea or an ocean.

In another embodiment, the aerospace vehicle may comprise a spacecraft containing a propulsion system powered by the airship. The spacecraft is coupled to a balloon comprising lighter than air gas such as hydrogen or helium, adapted to lift the spacecraft to an altitude. Upon reaching a maximum altitude, the balloon is deflated by a control system present within the spacecraft and the gas from the balloon is directed towards the propulsion system of the space craft and/or to high pressure chambers or gas tanks for future use of the gas as a fuel for further powering the space craft to a greater altitude.

Figure 2A:
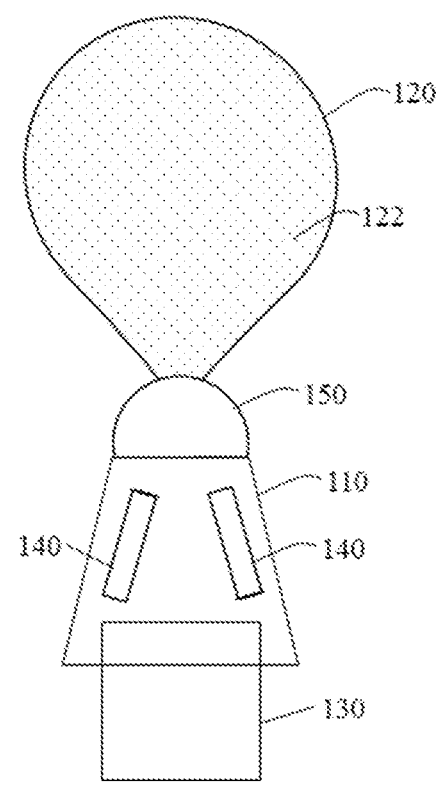
FIG. 2A is a perspective view of a spacecraft with balloon inflated during takeoff, according to an embodiment of the invention.
Figure 2B:
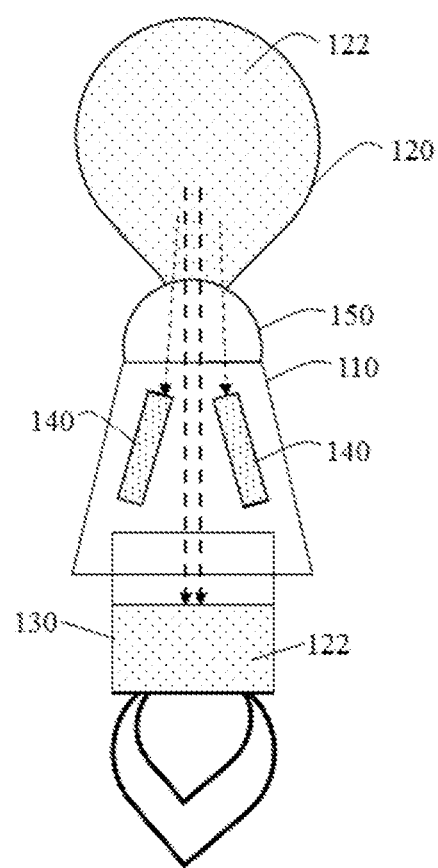
FIG. 2B is a perspective view of the spacecraft with balloon deflating and emptying the contents into a propulsion system.

FIG. 2A shows the spacecraft 110 comprising a propulsion system 130 and high pressure chambers or gas tanks 140 and a control system 150. The spacecraft 110 is coupled to the balloon 120 inflated with a lighter than air gas 122. During takeoff, the spacecraft overcomes the highest force of gravity due to the fact that the spacecraft fuel is lighter than air. FIG. 2B shows a-perspective view of the spacecraft 110 with the balloon 120 and the control system 150 for deflating and emptying the contents (lighter than air gas or gases) 122 into the propulsion system 130 and/or to the high pressure chambers 140 for future use as a fuel for further ascending the spacecraft to a greater altitude. The transfer of gas from the 120 balloon to the propulsion system 130 and storage unit 140 is indicated by dotted arrow lines.

Figure 2C:
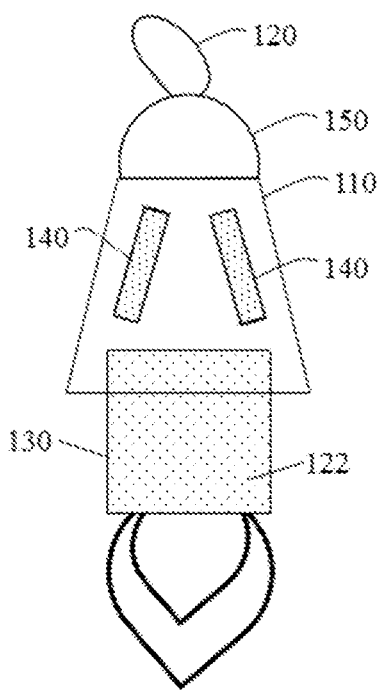
FIG. 2C is a perspective view of the spacecraft with the balloon completed deflated.

FIG. 2C shows a perspective view of the spacecraft 110 with the balloon 120 completely deflated by the control system 150 by transferring the contents (gas) 122 to the propulsion system 130 and/or to the storage unit 140 for future use. In an embodiment, the propulsion system 130 may comprise an engine, adapted to power the spacecraft 110 towards further altitude by utilizing the gas from the storage unit 140 as a fuel source.

In an embodiment, the balloon may comprise parachute adapted for safe landing after getting disengaged from the spacecraft. The landed balloon can be reused for flying another aerospace vehicle including a spacecraft.

The aerospace vehicle comprising manned or unmanned aircraft or a spacecraft coupled with an airship powered by lighter than air gas or gases provides numerous advantages including eliminating the need for runway for takeoff or landing for aircrafts and eliminating the need for expensive launch base for space crafts. Another advantage includes elimination of conventional aircraft or spacecraft fuel that may contain potentially hazardous pollutants which contaminates the environmental air and lead to dumping of toxins in fields or residential areas surrounding airports.

In an embodiment, the balloon 120 coupled to the aerospace vehicle, acts as an emergency floatation tool. For example, the gas 122 within the storage unit comprising high pressure gas chambers or gas tanks 140 can be used by the control system 150 for re-inflating the balloon 120 during emergency landing and the inflated balloon enables the spacecraft 110 to remain afloat in the air or to float on a waterbody. In another example, the collapsed or deflated balloon 120 can be re-inflated using the gas 122 stored in the storage unit 140 in the event of failure of the spacecraft engines or propulsion system 130.

The present invention has been described with a preferred embodiment thereof and it is understood that many changes and modifications to the described embodiment can be carried out without departing from the scope and the spirit of the invention that is intended to be limited only by the appended claims.

What is claimed is:

1. An aerospace vehicle comprising:
 a spacecraft comprising a propulsion system;
 a balloon containing hydrogen, configured to elevate the spacecraft; and
 a control system configured to:
  deflate the balloon upon reaching a predetermined altitude, by directing hydrogen into the propulsion system and at least one high pressure gas chamber for further powering and ascending the spacecraft; and
  re-inflate the balloon using hydrogen stored in the high pressure gas chamber.

2. The aerospace vehicle of claim 1, wherein the propulsion system comprises at least one engine, adapted to power the spacecraft.

* * * * *